United States Patent [19]

Stone et al.

[11] 4,374,207

[45] Feb. 15, 1983

[54] INTUMESCENT FLEXIBLE POLYURETHANE FOAM

[75] Inventors: Herman Stone, Hazleton; Peter D. Pauly, Mountaintop; Pcolinsky, Jr., Hazleton, all of Pa.

[73] Assignee: G.F.C. Foam Corporation, Paramus, N.J.

[21] Appl. No.: 200,128

[22] Filed: Oct. 24, 1980

[51] Int. Cl.³ .............................................. C08G 18/14
[52] U.S. Cl. ................................... 521/107; 521/113; 521/115; 521/118; 521/123
[58] Field of Search ............... 521/107, 113, 115, 118, 521/123

[56] References Cited

U.S. PATENT DOCUMENTS

| | | | |
|---|---|---|---|
| 3,262,894 | 7/1966 | Green | 521/107 |
| 3,681,273 | 8/1972 | Kelly | 260/DIG. 24 |
| 3,803,063 | 4/1974 | Krentz | 260/18 N |
| 3,810,851 | 5/1974 | Norman et al. | 521/123 |
| 3,897,372 | 7/1975 | Kehr et al. | 521/106 |
| 3,909,464 | 9/1975 | Anonga et al. | 521/123 |
| 4,139,501 | 2/1979 | Rudner et al. | 521/136 |
| 4,143,029 | 3/1979 | Matthews et al. | 260/45.8 NT |
| 4,162,276 | 7/1979 | Rim et al. | 260/45.95 G |
| 4,197,373 | 4/1980 | Miano et al. | 521/118 |
| 4,230,822 | 10/1980 | Murch et al. | 521/106 |

*Primary Examiner*—Maurice J. Welsh
*Attorney, Agent, or Firm*—Thomas E. Spath; James P. Scullin

[57] ABSTRACT

Flexible, resilient, polyurethane foam having improved flame retardancy and intumescent properties is prepared from a reaction mixture comprising a polyether polyol, an organic polyisocyanate, a blowing agent, a surfactant, a catalyst, a flame retardant, and hydrated alumina. Alternatively, the mixture also comprises a low-viscosity linear polyester.

The hydrated alumina is predispersed in a mixture comprising flame retardant and low-viscosity linear polyester, and alternatively a char former and a fugitive viscosity modifier.

36 Claims, No Drawings

INTUMESCENT FLEXIBLE POLYURETHANE FOAM

BACKGROUND OF THE INVENTION

1. Field of the Invention

This invention relates to improvements in flexible, resilient, polyurethane foams, and in particular to improvements in the characteristics of such foams when subjected to fire. The primary objective of the invention is to provide polyurethane foams having significantly enhanced resistance to combustion even when they are exposed to an intense ignition source. Flexible resilient polyurethane foams are made by the reaction of polyols and organic polyisocyanates in the presence of one or more blowing agents, one or more surfactants, and one or more catalysts. The foams find a variety of uses, such as carpet underlay, textile innerlining, mattresses, pillows, furniture padding, cushions, automobile crash pads, and insulation. Unless formulated with special additives, polyurethane foams burn readily when ignited. It is known in the art to add various flame retardant chemicals to polyurethane foam-forming reaction mixtures, in particular to add halogenated esters of phosphorus. This has resulted in some improvement in the flammability properties, the extent of burning after ignition by a low intensity source being reduced and the foams may even be made self-extinguishing to some degree in small scale laboratory tests; but while combustion does occur the foam melts and may drip flaming embers which may ignite other flammable materials in the vicinity and thus cause the fire to spread. Such so-called "self-extinguishing" foams are generally not resistant to ignition by anything other than a low-intensity ignition source. In order to overcome this problem other additives have been added to polyurethane foam-forming reaction mixtures to render the finished foams intumescent, or capable of producing a char, once having been ignited. Such foams are less prone to the development of flaming, dripping, embers during combustion, and produce a char which can act as a thermal insulating barrier and thus slow or prevent the spread of the fire.

2. Description of the Prior Art

In U.S. Pat. No. 3,681,273 the use of a mixture of a nitrogen and phosphorus containing compound such as monoammonium phosphate, melamine phosphate, or urea phosphate, and an N-alkylol substituted polyalkylene polyamine as an additive to conventional flexible polyurethane foam reaction mixtures is disclosed. The resultant foams are flame-retardant, intumescent, and non-burning.

U.S. Pat. No. 3,803,063 discloses a flexible polyurethane foam reaction mixture containing an additive comprising a nitrogen and phosphorus containing compound such as monoammonium phosphate or an ammonium phosphate and a polycondensate of polymerized unsaturated fatty acids with aliphatic amines.

U.S. Pat. No. 3,897,372 discloses hydrophilic polyurethane foams having flame retardancy and reduced smoke density, prepared by reacting a resin prepolymer, water, alumina hydrate, boric acid, and a melamine derivative. Optionally, the reaction mixture can also contain silica.

In U.S. Pat. No. 4,139,501, Rudner, Noone and Pauly disclose flexible polyurethane foams having reduced tendency to form burning embers when ignited and burned, produced by incorporating into the foam-forming reaction mixture a melamine derivative wherein one or more hydrogen atoms have been replaced by hydroxymethyl and/or lower alkoxymethyl groups. Alternatively, a halogenated phosphorus ester can also be included in the reaction mixture.

U.S. Pat. No. 4,143,029 discloses dripless, fire-retarded polyurethane elastomers comprising a blend of an elastomer with a hexaalkoxymethylmelamine, a trihydrocarbylcarbonylmelamine, and an aromatic bismaleimide or aromatic bismaleimide generator.

U.S. Pat. No. 4,162,276 discloses non-dripping, self-extinguishing, polyurethane elastomers comprising a blend of an elastomer with a hexaalkoxymethylmelamine, an organic halogen-containing compound such as a chlorinated paraffin, and a P-substituted phosphocyclopentane 1-oxide.

U.S. Pat. No. 4,197,373 discloses polyether polyurethane foams prepared from conventional foam-forming reaction mixtures containing as a flame retardant a melamine derivative having a 2,2,2-trichloromethyl group, such as N,N'-bis(1-hydroxy-2,2,2-trichloroethyl)melamine.

SUMMARY OF THE INVENTION

This invention provides flexible, resilient, polyether polyurethane foams with substantially improved char-forming, or intumescent, properties, as compared with prior art polyurethane foams, such as those disclosed in U.S. Pat. No. 4,139,501. The improvement is obtained by adding to a conventional polyether polyurethane foam-forming reaction mixture at least one flame retardant, and hydrated alumina. Alternatively, the reaction mixture can also contain a char former, such as a melamine derivative and a low-viscosity linear polyester polyol. The melamine derivatives are those in which one or more hydrogen atoms of melamine have been replaced by hydroxymethyl and/or lower alkoxymethyl groups. The amounts of flame retardant used are generally substantially greater than the amounts used in U.S. Pat. No. 4,139,501. In order to incorporate the large amounts of hydrated alumina used into the foam-forming reaction mixture, a premix of pumpable viscosity is prepared by dispersing the alumina in a synergistic viscosity modifier composition.

The flexible foams of U.S. Pat. No. 4,139,501 were a significant step forward in the art by virtue of their ability to produce a char when ignited and to resist the formation of dripping embers when ignited. However, still more stringent performance requirements have recently been put on flexible urethane foams with respect to resistance to burning, especially for such uses as institutional mattresses and upholstery, and more rigorous test methods have been developed to evaluate them. Although these prior art foams give good results when tested by ASTM D 1692-68 or by a modification of UL94 published by Underwriters Laboratories (the modification being to measure flame time from the start of ignition rather than 60 seconds after ignition), and provide adequate flame resistance for many applications, they have been found to be inadequate when evaluated by the recent more rigorous test procedures. One example of such a method is exposure of a vertically-held piece of foam to the flame of a propane gas blowtorch for periods of time ranging from 10 seconds to 3 minutes, the flame being applied to the middle of the vertical surface. When tested by this method, conventional urethane foams that do not contain flame retardants ignite rapidly and continue to burn after the blowtorch flame is removed until they are completely consumed. Those foams that contain conventional levels of such flame retardants as halogenated phosphate esters are rapidly burned through by the torch flame, even though the foam may not always be completely combusted. The char-forming foams made according to U.S. Pat. No. 4,139,501 generally continue to burn for a period of time after the blowtorch flame is removed, although they resist being totally consumed and usually will be self-extinguishing. Depending on the thickness of the test piece however, the foam may be severely damaged. By way of example, a test piece having a thickness of one inch or less may have a hole burned completely through it. In contrast to this, when tested by exposure to a blowtorch the intumescent foams of the present invention cease to burn within 0–10 seconds after removal of the torch flame. There is little damage to the interior of the foam due to the heavy char layer which forms.

The foams of this invention can be used in most or all of the applications where conventional flexible foams have heretofore been used. These novel foams can, if desired, be peeled, split, or sliced into sheets of any desired thickness using techniques well-known in the art, and the flexible sheets also can be rolled up for convenient storage and transportation. Like conventional flexible polyurethane foams, the products of the present process can be laminated to textiles or plastic substrates by conventional methods, such as by means of adhesives.

DETAILED DESCRIPTION OF THE INVENTION

The objective of this invention is accomplished by incorporating into an otherwise conventional polyether polyurethane foam-forming reaction mixture an unusually high level of a flame retardant, and a high level of hydrated alumina (also known as alumina trihydrate, aluminum hydroxide, aluminum hydrate, and hydrated aluminum oxide). In an alternative, and preferred, embodiment of this invention the foam-forming reaction mixture can also contain a char former and/or a low viscosity linear polyester polyol.

Suitable flame retardants are those conventionally used in the art of making flexible polyurethane foams, and include tri-esters of phosphoric acid, halogenated tri-esters of phosphoric acid, halogenated hydrocarbons, and the like. Although liquid flame retardants are generally preferred, solid materials, such as for example decabromodiphenyl oxide, can also be used.

Examples of suitable liquid flame retardants are: tris(1,3-dichloropropyl)phosphate, tris(2,3-dibromopropyl)phosphate, 2,2-bis(chloromethyl)-1,3-propylene bis di[(2-chloroethyl)phosphate], tris(2-chloroethyl)phosphate, tris(2-chloropropyl)phosphate, bis(dichloropropyl)tribromoneopentyl phosphate, tetrakis(2-chloroethyl)ethylene diphosphate (sold by Olin Chemicals as THERMOLIN®101), FYROL®EFF (oligomeric chloroalkyl phosphate, sold by Stauffer Chemical Co.), tricresyl phosphate, cresyl diphenyl phosphate, chlorinated paraffin, and brominated paraffin. Halogenated phosphates are preferred liquid flame retardants in the practice of this invention, especially tris(1,3-dichloropropyl)phosphate (FYROL®FR-2, Stauffer), tris(2-chloroethyl)phosphate (FYROL®CEF, Stauffer), and tetrakis(2-chloroethyl)ethylene disphosphate (THERMOLIN®101). A preferred solid flame retardant is decabromodiphenyl oxide. Although a single flame retardant is advantageous from the standpoint of simplicity of formulation, mixtures of two or more of the same type or of different types may be found to give improved performance in some cases, and such mixtures are included in the scope of this invention. The amount of flame retardant can be varied over a wide range, from about 30 to about 160 or more parts by weight per 100 parts by weight of polyether polyol in the reaction mixture. It is preferred to use from about 50 to about 145 parts by weight.

The amount of hydrated alumina can be varied from about 200 parts by weight to about 400 or more parts by weight per 100 parts by weight of polyether polyol in the foam-forming reaction mixture, with the preferred range being from about 230 to about 350 parts by weight. Although the particle size of the alumina hydrate is not critical, too coarse a particle size may be ineffective in producing a suitable intumescent foam, and too fine a particle size may produce too high a viscosity, as will too high an oil absorption value, and thus cause difficulties in blending the reaction mixture. Grades of hydrated alumina having an average particle size of 16 microns or less are generally not desirable since they tend to produce too high a viscosity, and grades containing coarse particles (for example, in which 5–20% is retained on a 100 mesh screen, 65–90% is retained on a 200 mesh screen and 90–98% is retained on a 325 mesh screen) may lead to some shrinkage of the foam. A suitable grade of hydrated alumina, for example, is one in which 0–3% is retained on a 200 mesh screen and 45–85% is retained on a 325 mesh screen, and in which the average particle size is 20–30 microns. Some commercially available grades that are satisfactory for use in this invention are Alcoa C-30BF, Imco 753, Southern Talc 753, Reynolds RH 130, and Alcoa C-230.

Previous to the present disclosure, it has been found to be very difficult or virtually impossible to incorporate high levels of fillers such as hydrated alumina into polyether polyurethane foam, especially when the foam is made by the one-shot process. Attempts to disperse large quantities of particulate fillers in polyether polyols led to viscosities which were difficult or impossible to pump, or to be handled in any manner on a practical, commercial, scale. It has now been found that by the use of certain viscosity modifiers or synergists, relatively low viscosity and pumpable dispersions of hydrated alumina can be made. These novel dispersions are readily handled and pumped, and are quite suitable for use in the one-shot foam-making method. The dispersions and the method of making them constitute important features of this invention. In order to obtain a uniform distribution of hydrated alumina throughout the reaction mixture and the resultant foam, it is essential to form a premix of the hydrated alumina in one or more, or a portion thereof, of the liquid components of the reaction mixture. Any of the known types of apparatus for dispersing particulate solids in liquids can be used.

It has been found that low viscosity dispersions, having viscosities in some cases as low as about 30,000–50,000 cps, can be made by dispersing the hydrated alumina in a blend which comprises all of the flame retardant (or retardants if two or more are used), and a low-viscosity, linear, polyester polyol. These dispersions are readily pumpable and can be introduced as a separate stream to the mixing head of a conventional apparatus for the continuous one-shot manufacture of urethane foam. If a char former is used, it is also incorporated into the dispersion, as is any solid flame retardant which may be used. The process wherein such dispersions are made and used in foam making is a particularly preferred embodiment of the present invention.

The low-viscosity, linear (i.e., difunctional) polyester polyols that preferably are used in preparing the dispersions can be made by the reaction of a glycol such as diethylene glycol with an aliphatic dibasic acid such as adipic acid, and have viscosities in the range of about 400–500 cps at 25° C. Some examples of suitable commercial products are LEXOREZ 1100-220 sold by Inolex Corp., and L-1217 and FOMREZ 11-225, both sold by Witco. The amount of the low-viscosity linear polyester polyol to be used will vary depending on the amount of hydrated alumina to be dispersed, the amount and type of flame retardant or retardants to be used, and the viscosity that is desired in the dispersion. It is preferred to use from about 10 to about 100 parts by weight per 100 parts by weight of polyether polyol (i.e., from about 10 to about 100 PHR) although greater or lesser amounts can be used if desired without departing from the scope of the invention. It is particularly preferred to use from about 35 to about 80 PHR. The dispersions thus will comprise from about 10 to about 100 parts by weight low-viscosity linear polyester polyol, from about 30 to about 160 parts by weight of at least one flame retardant, and from about 200 to about 400 parts by weight hydrated alumina. Alternatively, the dispersions can also comprise from about 1 to about 30 parts by weight of char former.

The low-viscosity, linear, polyester polyol not only functions as a dispersant for the hydrated alumina, but quite surprisingly it also functions to enhance the flame retardant and intumescent properties of the resultant foam. This is a completely unexpected result, since the linear polyester polyol has no inherent resistance to burning and would be expected to be totally consumed by fire.

If an even lower viscosity dispersion of hydrated alumina is desired for ease of incorporation into the foam-forming reaction mixture, it can be achieved by including in the dispersion one or more low-boiling, fugitive, halogenated hydrocarbons. Examples of suitable halogenated hydrocarbons are methylene chloride and chlorofluorocarbons, such as trichloromonofluoromethane. The use of such a fugitive viscosity modifier constitutes a preferred embodiment of the invention. The amounts used will usually be from about 2 to about 20 parts by weight per 100 parts by weight of polyether polyol, although lesser or greater amounts can be used if desired.

The char formers used in the practice of this invention include: low molecular weight aliphatic aldehydes, preferably those containing from 1 to about 4 carbon atoms such as formaldehyde, acetaldehyde, propionaldehyde, butyraldehyde, glyoxal, acrolein, and the like; aldehyde generators that are capable of releasing low molecular weight aldehydes under the conditions which prevail when polyurethane foam is ignited, such as paraformaldehyde, metaldehyde, acetals and semiacetals of low molecular weight aldehydes, hexamethylenetetramine, and the like; partially—or completely etherified urea/formaldehyde condensates, such as BEETLE ®65 (methylated urea/formaldehyde resin) or BEETLE ®80 (butylated urea/formaldehyde resin) both sold by American Cyanamid; melamine; and melamine derivatives having the formula

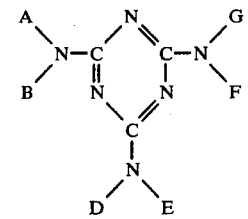

In the preceding formula, A,B,D,E,F and G are hydrogen, hydroxymethyl (methylol) or $ROCH_2-$ wherein R is an alkyl radical containing from one to four carbon atoms, such as methyl, ethyl or t-butyl. At least one of A,B,D,E,F and G is hydroxymethyl or $ROCH_2-$. Examples of compounds falling within the scope of the formula are tris-(hydroxymethyl)melamine, tris-(hydroxymethyl)tris-(methoxymethyl)melamine, hexa-(methoxymethyl)melamine, hexa-(hydroxymethyl melamine and tetra-(n-butoxymethyl)melamine.

In general, the amount of char former used will be from about 5 to about 30 parts by weight per 100 parts by weight of the polyether polyol present in the mixture to be foamed, but greater or lesser amounts can be used without departing from the scope of the invention. The preferred amount is from about 10 to about 25 parts by weight, per 100 parts by weight of the polyether polyol. The char formers can be used either as solutions or dispersions in water or other solvents, or as essentially 100% active materials without solvent. It is preferred to use the latter form, in the absence of water, to provide greater latitude in formulating a reaction mixture. When water is used as a blowing agent, it is preferred to add it separately rather than as a solvent for the char former. Melamine derivatives are preferred char formers and a particularly preferred melamine derivative is hexamethoxymethylmelamine, which is readily obtainable in a form free, or substantially free, from water. Hexamethylenetetramine can be added either as a concentrated aqueous solution or as a dry powder. It is particularly preferred to add it as a dry powder, and for this purpose the most preferred form is a dry powder which has been made free-flowing by the addition of a minor amount of benzoic acid, methylbenzoic acid, or chlorobenzoic acid as an an antiagglomerant, as taught by U.S. Pat. No. 2,912,435 for example. Although it is preferred to use a single char former, for simplicity in formulating, it may sometimes be desirable to use two or more, and such combinations are included in the scope of the invention.

The mixture to be foamed will include at least one polyether polyol, at least one organic polyisocyanate, at least one blowing agent, and at least one catalyst. Alternatively, the mixture to be foamed can also comprise other known additives and compounding ingredients for the preparation of polyurethane foams. Such additives and ingredients include, by way of example, pigments or other colorants, surfactants, foam stabilizers, cell openers lubricants, microbicides, and so forth.

The polyether polyol can be selected from any of the wide variety of polyhydric polyether compounds available and conventionally used by the art for the preparation of flexible ether-type polyurethane foams. The most common polyether polyol compounds, the polyoxyalkylene polyether polyols, are generally prepared by the reaction of an alkylene oxide, such as 1,2-propylene oxide, with a polyhydric initiator or starter. The polyhydric initiator or starter can be, for example, glycerol, trimethylolethane, trimethylolpropane, triethanolamine or a polyethylene glycol.

The alkylene oxides used in preparing the polyethers preferably are those which contain from two to four carbon atoms, for example, ethylene oxide, 1,2-propylene oxide, 1,2-butylene oxide, trimethylene oxide and tetramethylene oxide. Also useful are the poly(aralkylene ether) polyols which are derived from the corresponding aralkylene oxides such as, for example, styrene oxide, alone or mixed with an alkylene oxide. Generally, propylene oxide, i.e., the 1,2-propylene oxide, and mixtures of 1,2-propylene oxide with ethylene oxide, are preferred for the preparing of the polyether polyol reactant. Also useful as polyols in the practice of this invention are the so-called graft polymers, i.e. polyether polyols which have been modified with acrylonitrile and/or styrene in such a way that some is grafted onto the backbone of the polyether polyol (but not on the functional, hydroxyl, group) and some is present as a polymer dispersed in the polyol.

A particularly preferred class of polyether polyols are those which comprise a dispersion of a polyurea or a polyhydrazodicarbonamide in a conventional polyol prepared by the reaction of alkylene oxides and a polyhydric initiator. Typically, the amount of dispersed polyurea or polyhydrazodicarbonamide will range from about 5 to about 20% by weight of the total dispersion. The preparation of this class of modified polyols is described in U.S. Pat. Nos. 3,325,421, 4,042,537, 4,089,835, 4,093,569, and 4,184,990. Some examples of commercially available dispersions are MULTRANOL ®E-9148, MULTRANOL ®E-9151, and MULTRANOL ®E-9225, all sold by Mobay Chemical Corporation. Although the polyurethane foams of this invention can be made using one or more polyether polyols which comprise the reaction products of alkylene oxides and initiators, or one or more of the graft polyether polyols described above, or mixtures thereof, it is preferred that at least a portion of the polyol be one that comprises a dispersion of a polyurea and/or a polyhydrazodicarbonamide. If desired, such polyether polyols containing dispersed polyureas and/or polyhydrazodicarbonamides can comprise the entire polyol portion of the foamforming reaction mixture. A single polyol of this type, or a mixture of two or more, can be used.

The polyethers for use in the present invention preferrably have molecular weights of from about 500 to about 6500, and optimally from about 2800 to about 4600, and an average hydroxy functionality of from about 2.5 to about 3.1.

The organic polyisocyanates useful in the present invention are also conventional. They contain at least two isocyanate groups per molecule; and preferably the isocyanate mixture selected has an isocyanate functionality of from 2.0 to 3.0. The useful isocyanates are the aromatic polyisocyanates alone or admixed with aliphatic, cycloaliphatic or heterocyclic polyisocyanates.

The aromatic diisocyanates are generally the least expensive and most suitable polyisocyanates available. The aromatic diisocyanates, especially the tolylene diisocyanate isomers, are used commercially in the preparation of flexible foam by the one-shot, continuous slabstock process. However, for certain purposes, other polyisocyanates, especially the aliphatic, aralkyl and cycloalkyl polyisocyanates, have valuable properties and can be used, if desired, in admixture with, e.g. tolylene diisocyanates. The aralkyl, aliphatic and cycloaliphatic polyisocyanates are especially useful when resistance against degradation and discoloration due to oxidation or light is needed. The non-aryl polyisocyanates are generally not useful alone, but can be used in combination with the other types for special purposes.

Suitable organic polyisocyanates include, for example, n-butylene diisocyanate, methylene diisocyanate, m-xylyl diisocyanate, p-xylyl diisocyanate, cyclohexyl-1,4-diisocyanate, dicyclohexylmethane-4,4'-diisocyanate, m-phenylene diisocyanate, p-phenylene diisocyanate, 3-(alpha-isocyanatoethyl)-phenyl isocyanate, 2,6-diethylbenzene-1, 4-diisocyanate, diphenyldimethylmethane-4,4'-diisocyanate, ethylidene diisocyanate, propylene-1,2-diisocyanate, cyclohexylene-1,2-diisocyanate, 2,4-tolylene diisocyanate, 2,6-tolylene diisocyanate, 3,3'-dimethyl-4,4'-biphenylene diisocyanate, 3,3'-dimethoxyl-4,4'-biphenylene diisocyanate, 3,3-diphenyl-4,4'-biphenylene diisocyanate, 4,4'-biphenylene diisocyanate, 3,3'-dichloro-4,4'-biphenylene diisocyanate, 1,5-naphthalene diisocyanate, isophorone diisocyanate, m-xylene diisocyanate, triazine triisocyanate, triketotrihydrotris (isocyanatophenyl) triazine and tris-(isocyanatophenyl) methane. The preferred isocyanates in the practice of this invention are the tolylene diisocyanates, especially mixtures of the 2,4 and 2,6 isomers such as those containing 65% of the 2,4 isomer and 35% of the 2,6 isomer (TDI 65/35), and those containing 80% of the 2,4 isomer and 20% of the 2,6 isomer (TDI 80/20). In the manufacture of conventional polyether polyurethane foams the more expensive TDI 65/35 is often used because the reaction mixture tends to rise and gel faster and the resultant foam tends to have a more open cell structure. Surprisingly, in the practice of this invention the less expensive TDI 80/20 gives entirely satisfactory rise and gel time as well as a satisfactory degree of open cell formation, and is a particularly preferred isocyanate.

Generally, in carrying out the urethane polymerization reactions, the only significant groups in the reactant compounds are the isocyanate groups and active hydrogen groups which are reactive therewith. Acyclic, alicyclic, aromatic and heterocyclic radicals are all possible substituents on the active hydrogen and polyisocyanate reactants.

The preferred blowing agent for general use in the production of the flexible polyurethane foam is water. The advantages of using water are low cost and the stability which the use of water adds to the foam-making. The water-isocyanate reaction not only produces gas for blowing, but also produces urea-containing polymer very quickly, contributing materially to early polymer strength needed to hold the gas inside, to form foam. The water-isocyanate reaction also provides much of the heat required for satisfactory curing of the foam. Generally, when water is used, it is present in proportions of from about 0.5 to about 6 weight percent of water based on the total weight of the reacting polyols. Blowing agents which do not react with the isocyanate can be used as an adjunct with water or as a total replacement of water. These include compounds which are vaporized at the temperatures produced by the exotherm of the isocyanate-reactive hydrogen reaction. The various blowing agents are well known in the art and constitute no part of the present invention. Other blowing agents that are preferably used by the art include certain halogen-substituted aliphatic or cyclo-aliphatic hydrocarbons having boiling points between about −40° C. and +100° C., including methylene chloride, the volatile fluorocarbons, such as trichloromonofluoromethane, dichlorodifluoromethane, and 1-chloro-2-fluoroethane; low boiling hydrocarbons such as n-propane, cyclopropane, butane, isobutane, pentane, hexane, cyclohexane and their mixtures, and the like.

As is conventional in the art pertaining to the manufacture of polyurethane foam, the reaction mixture will also contain a catalyst. Catalysts suitable for use in this invention are conventional ones in the polyurethane foam art, and include tertiary amines and metallic compounds. Useful tertiary amines include: N-alkylmorpholines such as N-ethylmorpholine; N,N-dialkylcyclohexylamines where the alkyl groups are methyl, ethyl, propyl, butyl, etc.; trialkylamines such as triethylamine, tripropylamine, tributylamine, triamylamine, etc.; triethylenediamine, bis(2-dimethylaminoethyl) ether; N,N dimethylaminoethyl-N',N'-dimethylaminopropyl ether; the tertiary amine sold by Jefferson Chemical Co., under the name THANCAT DD: and other tertiary amines well known in the art. Useful metal compounds include those of bismuth, lead, titanium, iron, antimony, uranium, cadmium, cobalt, aluminum, mercury, zinc, nickel, cerium, vanadium, copper, manganese, zirconium, tin, and others. Tin compounds are particularly useful, some examples being stannous octoate, (stannous 2-ethylhexoate), stannous oleate, dibutyltin bis(2-ethylhexoate), and dibutyltin dilaurate. The levels of catalyst used are conventional.

As is also conventional in the art of manufacturing polyurethane foam, the reaction mixture can contain a surfactant, if desired. The surfactant can be an organosilicon surfactant (also commonly termed a silicone surfactant), it can be a surfactant which does not contain silicon, or both types can be used in combination if desired. Regardless of the type used, either a single surfactant or a combination of two or more can be used. The surfactant per se does not form a part of this invention. As those skilled in the art will be aware, surfactants for use in making urethane foams are sold by many suppliers, generally as proprietary products without disclosure of exact chemical composition or structure. The amounts used will vary from about 0.01 to about 1 part, or more, per 100 parts by weight of the polyol (0.01 to 1 PHR)

In carrying out this invention the index, the stoichiometric balance between the equivalent weights of the polyisocyanate and of the total of polyol and water (if used), can vary from a negative index (less than 100, representing a shortage of polyisocyanate) to a positive index (greater than 100, representing an excess of polyisocyanate). The index will generally range from about 95 to about 115, but even lower or higher indices can be used if desired. It has been found that reaction mixtures having an index of at least 100 yield foams having better flame retardance and intumescent properties than those having an index of less than 100. Thus an index of at least 100 is a preferred mode.

The polyurethane foams according to this invention can be prepared by any of the methods known in the art, including prepolymer and quasiprepolymer, but it is preferred to prepare them continuously by the one-shot method in the form of large buns having a rectangular or circular cross-section which can then be split or peeled into sheets of suitable thickness. For example, buns having a circular cross-section and suitable for peeling are disclosed in U.S. Pat. No. 3,874,988, to Buff et al. The polyurethane foams can be essentially completely open-celled, partly open-celled, or predominantly closed-celled.

Of the following examples, some of which are comparative examples according to the prior art and others of which are according to the present invention, those made according to the present invention are illustrative thereof but not limitative thereof. In these examples, all amounts shown are parts by weight.

Test methods used for evaluating the flame retardant and intumescent properties of the foams include: ASTM E162-78 Radiant Panel Test; a small scale roll-up test; and the so-called "Michigan Mattress Test".

The Michigan Mattress Test consists of rolling up a mattress, tieing it either in the center or at both ends, stuffing newspaper in the center core of the rolled-up mattress, placing the mattress at an angle, and igniting the paper. The mattress will either be totally consumed by the fire, or the fire will self-extinguish after a period of time with the mattress being only partly damaged or consumed. The mattress can be either covered or uncovered. Unless noted otherwise, the tests described herein were run on uncovered mattresses.

The small scale roll-up test simulates the conditions of the Michigan Mattress Test but only requires a much smaller foam piece: ½×6×12 inches instead of a mattress-size piece such as 3×35×72 inches, for example. It can be run quickly, in the laboratory, and when only a limited quantity of foam is available. It is particularly useful as a screening test to determine whether a given foam made on a laboratory or small pilot plant scale shows enough promise to warrant producing on a larger pilot-plant scale or full plant scale in order to run the Michigan Mattress Test. In this small scale procedure the foam sample is wrapped along its long axis around a mandrel having a diameter of 2 inches. The resulting tube is then held together at its top and bottom with staples, and the mandrel is removed. The ignition source is two opened books of matches placed back-to-back and stapled together so that one double row of matches is above the other. The match book assembly is then inserted in the center core of the rolled-up foam, and the roll is then placed at a slight angle from the horizontal by letting one end rest on a piece of ½ inch diameter pipe about 6 inches long. The bottom book of matches is then ignited by an external source. The test is carried out in an open-top chamber having dimensions 18×21×48 inches constructed of asbestos boards on three sides, and a transparent plastic sheet on the fourth side to permit observation while the test piece is burning. This chamber is placed under an exhaust hood to remove smoke and fumes, but with insufficient draft to materially affect the area in which the sample is being burned. The test sample is weighed before and after burning, the time elapsed from ignition until the sample self-extinguishes is recorded, and visual observation is made of smoke generated. If the sample fails to self-extinguish the fire is put out with a fire-extinguisher, and that fact is recorded.

The following are the identities of various ingredients used in the examples. M-3901 is propoxylated glycerol, molecular weight 6000, hydroxyl no. 28, sold by Mobay Chemical Corp., as MULTRANOL® 3901. E-9148 and E-9151 are 20% by weight dispersions of a polyhydrazodicarbonamide in a polyether polyol, sold by Mobay Chemical Corp. as MULTRANOL® E-9148 and MULTRANOL® E-9151, respectively. CP-3010 is propoxylated glycerol, molecular weight 3000, hydroxyl no. 55-58, sold by The Dow Chemical Co., as VORANOL® 3010. L-1217 is a low viscosity, linear, polyester polyol sold by Witco. 1100-220 is a low viscosity, linear, polyester polyol sold by Inolex Corp., as LEXOREZ® 1100-220. TM-101 is THERMOLIN® 101, FR-2 is FYROL® FR-2, and CEF is FYROL® CEF. FR300 BA is decabromodiphenyl oxide, sold by The Dow Chemical Co.. CYMEL® 303 is hexa(methoxymethyl)melamine, sold by American Cyanamid Co.. POLYCAT® 77-50 is a 50% solution of an amine catalyst in dipropylene glycol sold by Abbott Labs. NIAX® A-1 is a 70% solution of bis(2-dimethylaminoethyl) ether in dipropylene glycol, sold by Union Carbinde Corporation. FOMREZ® C-4 is a 50% solution of stannous 2-ethylhexoate in di(2-ethylhexyl)phthalate, sold by Witco. DEOA is diethanolamine (85% aqueous solution), and T-12 is dibutyltin dilaurate sold by M & T Chemicals. DABCO® 33LV is a 33% solution of triethylenediamine in dipropylene glycol, sold by Air Products and Chemicals, Inc. TD-33 is triethylene diamine in propylene glycol, sold by Texaco, and 9251 is a 50/50 blend of dibutyltin dilaurate in di(2-ethylhexyl)phthalate. CNF 664 is believed to be a mixture of dibutyltin dichloride and triphenyl phosphine oxide in cresyl diphenyl phosphate sold by M & T Chemicals. L-5307 and L-5309 are non-hydrolyzable silicone surfactants for flexible polyether high resilience (HR) urethane foam, sold by Union Carbide Corporation. R-11 is trichloromonofluoromethane.

Examples 1 through 20 were hand batches, prepared in the laboratory.

EXAMPLES 1-5

| Example | 1 | 2 | 3 | 4 | 5 |
|---|---|---|---|---|---|
| M-3901 | 80.0 | 80.0 | 80.0 | 80.0 | 150.0 |
| E-9148 | 20.0 | 20.0 | 20.0 | 20.0 | 20.0 |
| TDI 80/20 | 38.0 | 75.0 | 66.0 | 66.0 | 66.0 |
| L-1217 | 10.0 | 100.0 | 80.0 | 70.0 | — |
| TM-101 | 25.0 | 25.0 | 25.0 | 50.0 | 50.0 |
| FR-2 | 25.0 | — | — | — | — |
| CYMEL® 303 | 20.0 | 5.0 | 15.0 | 20.0 | 20.0 |
| FR 300 BA | 20.0 | — | — | — | — |
| Hydrated alumina | 105.0 | 210.0 | 220.0 | 250.0 | 250.0 |
| Water | 2.0 | 2.5 | 2.5 | 3.0 | 3.0 |
| DEOA | 0.94 | 1.0 | 1.0 | 1.0 | 1.0 |
| POLYCAT® 77-50 | 0.40 | 0.40 | 0.40 | — | — |
| NIAX® A-1 | 0.15 | 0.15 | 0.15 | 0.10 | 0.10 |
| L-5307 | 1.0 | 1.5 | — | 1.5 | 1.5 |
| L-5309 | — | — | 1.5 | — | — |
| DABCO® 33LV | — | — | — | 0.3 | 0.3 |
| Cream time, sec. | 10 | 10 | 10 | 10 | — |
| Rise time, sec. | 120 | 150 | 180 | 165 | — |
| Density, pcf | 4.9 | 6.5 | 6.0 | 7.0 | 8.5 |

Each of these examples yielded a strong resilient, flexible foam. Examples 1 and 3-5 were subjected to the small scale roll-up test. The foam of Example 1, a comparative example having an insufficient amount of hydrated alumina, was completely consumed, whereas 92.6% by weight of the foam and char from Example 3 remained unburned. Three other comparators were tested by the same method: a neoprene foam having a density of 10 pcf, of which 93.6% by weight of foam and char remained unburned; a commercial polyurethane foam having a density of 9 pcf and promoted as an intumescent foam, of which 83.2% by weight of foam and char remained unburned; and an intumescent foam made according to the disclosure of U.S. Pat. No. 4,139,501, which was totally consumed. In a second series of tests using the same method, the foam of Example 3 self-extinguished in 160 seconds and 92.0% remained unburned; the foam of Example 4 self-extinguished in 120 seconds and 94.2% remained unburned; and the foam of Example 5, another comparative example that had an insufficient amount of hydrated alumina and that did not contain a low-viscosity linear polyester polyol, did not self-extinguish. The flame was put out with a fire extinguisher after 180 seconds, and only 66.3% by weight of the specimen remained unburned.

A modification of the small scale roll-up test, in which only one book of matches instead of two was used for ignition, was used to compare Example 2 with the neoprene foam. The foam of Example 2 self-extinguished in 65 seconds and 98.8% remained unburned, while the neoprene comparator self-extinguished in 90 seconds and 97.8% remained unburned.

In preparing Examples 1-4, a predispersion of hydrated alumina, flame retardants, char former, and low-viscosity polyester polyol was made before combining with the other ingredients. In the case of Example 4, 30 parts of M-3901 was also included in the predispersion. In the case of Example 5 the same procedure was followed except that 70 parts of M-3901 was used in the predispersion.

EXAMPLES 6-8

| Example | 6 | 7 | 8 |
|---|---|---|---|
| M-3901 | 60.0 | 80.0 | 80.0 |
| E-9148 | 40.0 | 20.0 | 20.0 |
| TDI 80/20 | 66.0 | 66.0 | 28.2 |
| 1100-220 | 70.0 | 70.0 | — |
| TM-101 | 50.0 | 50.0 | 20.0 |
| FR 300 BA | — | 20.0 | 20.0 |
| CYMEL® 303 | 20.0 | 20.0 | 10.0 |
| Hydrated alumina, Imco 753 | 250.0 | 230.0 | 120.0 |
| Water | 2.5 | 3.0 | 1.54 |
| DEOA | 1.0 | 1.0 | 0.94 |
| POLYCAT® 77-50 | — | — | 0.4 |
| NIAX® A-1 | 0.1 | 0.1 | 0.15 |
| T-12 | 1.0 | 0.65 | 0.15 |
| DABCO® 33LV | 0.5 | 0.5 | — |
| L-5307 | 1.5 | 1.5 | 1.0 |
| Index | 100 | 100 | 110 |
| Cream time, sec. | 10 | 10 | 6 |
| Rise time, sec. | 150 | 150 | 250 |

When subjected to the small scale roll-up test, the foam of Example 6 self-extinguished in 125 seconds and 95.6% by weight remained unburned; the foam of Example 7 self-extinguished in 127 seconds and 93.5% remained unburned; and the foam of Example 8 did not self-extinguish and was put out with a fire extinguisher after 120 seconds, and only 79.0% remained unburned. Example 8 was a comparative example, containing no low-viscosity linear polyester polyol and an insufficient amount of hydrated alumina. Example 6 shows the effect of increasing the level of E-9148, a polyether polyol containing a dispersion of polyhydrazodicarbonamide; and Example 7 shows the effect of lowering the amount of hydrated alumina and replacing it with an equal weight of decabromodiphenyl oxide.

In preparing Examples 6 and 7, the hydrated alumina was first dispersed in a mixture of the flame retardant, char former, and low-viscosity polyester. In the case of Example 8 the procedure was similar except that M-3901 was substituted for the low-viscosity polyester.

EXAMPLES 9-13

| Example | 9 | 10 | 11 | 12 | 13 |
|---|---|---|---|---|---|
| M-3901 | 80.0 | 80.0 | 80.0 | 80.0 | 80.0 |
| E-9148 | 20.0 | 20.0 | 20.0 | 20.0 | 20.0 |
| TDI 80/20 | 28.2 | 28.2 | 56.9 | 70.2 | 62.7 |
| L-1217 | — | — | 35.0 | 70.0 | 50.0 |
| TM-101 | 120.0 | 120.0 | 85.0 | 50.0 | 70.0 |
| FR 300 BA | — | 20.0 | — | — | — |
| CYMEL ® 303 | 20.0 | 20.0 | 20.0 | 20.0 | 20.0 |
| Hydrated alumina, Imco 753 | 250.0 | 230.0 | 250.0 | 250.0 | 250.0 |
| Water | 1.54 | 1.54 | 3.04 | 3.0 | 3.0 |
| DEOA | 0.94 | 0.94 | 0.94 | 1.0 | 1.0 |
| POLYCAT ® 77-50 | 0.4 | 0.4 | 0.4 | — | — |
| NIAX ® A-1 | 0.15 | 0.15 | 0.15 | 0.1 | 0.1 |
| DABCO ® 33LV | — | — | — | 0.3 | 0.3 |
| L-5307 | 1.0 | 1.0 | 1.0 | 1.5 | 1.5 |
| Index | 110 | 110 | 110 | 110 | 110 |
| Cream time, sec. | 9 | 8 | 6 | 8 | 9 |
| Rise time, sec. | 495 | 525 | 300 | 225 | 275 |
| Density, pcf | 10.6 | 10.4 | 6.1 | 6.3 | 6.4 |

In Example 11-13, the hydrated alumina was dispersed in a mixture of the low-viscosity polyester, flame retardant and char former before being combined with the other ingredients. In Examples 9 and 10, M-3901 was substituted for the low-viscosity polyester. Specimens from each example were subjected to the small scale roll-up test, with the results as summarized in Table I.

TABLE I

| | Ex. 9 | Ex. 10 | Ex. 11 | Ex. 12 | Ex. 13 |
|---|---|---|---|---|---|
| Time to self-extinguish, sec. | 150 | 150 | 153 | 170 | 190 |
| Weight % unburned foam and char | 95.0 | 94.8 | 78.7 | 94.8 | 80.9 |

EXAMPLES 14-20

| Example | 14 | 15 | 16 | 17 | 18 | 19 | 20 |
|---|---|---|---|---|---|---|---|
| M-3901 | 80.0 | 80.0 | 80.0 | 80.0 | 80.0 | 80.0 | 80.0 |
| E-9148 | 20.0 | 20.0 | 20.0 | 20.0 | 20.0 | 20.0 | 20.0 |
| TDI 80/20 | 70.2 | 70.2 | 70.2 | 70.2 | 70.2 | 70.2 | 70.2 |
| 1100-220 | 70.0 | 70.0 | 70.0 | 70.0 | 70.0 | 70.0 | 70.0 |
| TM-101 | 50.0 | — | 50.0 | 50.0 | 50.0 | 50.0 | 50.0 |
| CEF | — | 50.0 | — | — | — | — | — |
| CYMEL ® 303 | 20.0 | 20.0 | 20.0 | 20.0 | — | — | — |
| Melamine | — | — | — | — | 20.0 | — | — |
| BEETLE ® 80 | — | — | — | — | — | 20.0 | — |
| Hexamethylenetetramine | — | — | — | — | — | — | 20.0 |
| Hydrated alumina, Imco 753 | 250.0 | 250.0 | 250.0 | 250.0 | 250.0 | 250.0 | 250.0 |
| R-11 | 12.5 | — | — | — | — | — | — |
| Methylene chloride | — | — | 3.0 | — | — | — | — |
| Water | 3.0 | 3.0 | 3.0 | 3.0 | 3.0 | 3.0 | 3.0 |
| DEOA | 1.0 | 1.0 | 1.0 | 1.0 | 1.0 | 1.0 | 1.0 |
| NIAX ® A-1 | 0.1 | 0.1 | 0.1 | 0.1 | 0.1 | 0.1 | 0.1 |
| DABCO ® 33LV | 0.3 | 0.3 | 0.3 | 0.3 | 0.3 | 0.3 | 0.3 |
| L-5307 | 1.5 | 1.5 | 1.5 | 1.5 | 1.5 | 1.5 | 1.5 |
| Index | 110 | 110 | 110 | 110 | 110 | 110 | 110 |
| Cream time, sec. | 9 | 7 | 7 | 7 | 8 | 7 | 2 |
| Rise time, sec. | 180 | 205 | 215 | 250 | 185 | 225 | 110 |
| Density, pcf | 4.8 | 6.6 | 5.6 | 6.3 | 6.4 | 6.3 | 7.7 |

These examples illustrate the use of other char formers, of a different flame retardant, and of low-boiling halogenated hydrocarbons. In preparing these examples, the hydrated alumina was first dispersed in a mixture of the low-viscosity polyester, flame retardant, and char former before being combined with the other ingredients. In the case of Example 14, the halogenated hydrocarbon R-11 was also included in the dispersion of hydrated alumina, as was methylene chloride in the case of Example 16.

Specimens from each example were subjected to the small scale roll-up test, with the results as summarized in Table II.

TABLE II

| | Ex. 14 | Ex. 15 | Ex. 16 | Ex. 17 | Ex. 18 | Ex. 19 | Ex. 20 |
|---|---|---|---|---|---|---|---|
| Time to self-extinguish, sec. | 195 | 145 | 240 | 145 | 140 | 180 | 255 |
| Weight % of unburned foam and char | 82.3 | 95.5 | 95.9 | 92.0 | 92.2 | 97.1 | 93.3 |

Examples 21-31 were made by the one-shot process on a pilot plant continuous foam-making machine using a conveyor declination of 3°, in the form of buns having a generally rectangular cross section and a width of approximately 35 inches. In all cases, the hydrated alumina was first dispersed in a mixture of low-viscosity polyester, flame retardant, methylene chloride, and char former (when used). The dispersion was then added as a separate stream to the mixing head of the foam machine.

EXAMPLES 21-25

| Example | 21 | 22 | 23 | 24 |
|---|---|---|---|---|
| E-9151 | 100.0 | 100.0 | 100.0 | 100.0 |
| TDI 80/20 | 66.7 | 57.8 | 53.0 | 54.3 |
| 1100-220 | 70.0 | 35.0 | 35.0 | 35.0 |
| TM-101 | 50.0 | 105.0 | 105.0 | 105.0 |
| CYMEL ® 303 | 10.0 | 10.0 | 10.0 | 10.0 |
| Hydrated alumina | 250.0 | 250.0 | 250.0 | 250.0 |
| Methylene chloride | 3.0 | 3.0 | 3.0 | 3.0 |
| Water | 2.0 | 2.3 | 2.0 | 2.0 |
| DEOA | 1.0 | 2.5 | 2.5 | 2.5 |
| NIAX ® A-1 | 0.5 | 0.5 | 0.6 | 0.5 |
| TD-33 | 0.5 | 0.5 | 0.6 | 0.5 |
| 9251 | 0.17 | 0.2 | — | — |
| L-5307 | 0.75 | 0.75 | 0.75 | 0.75 |
| CNF 664 | — | — | 0.4 | 0.4 |
| Index | 115 | 118 | 115 | 118 |
| Density, pcf | 6.4 | — | 6.4 | 6.5 |

Specimens from Example 24 were subjected to the method of ASTM E162-78 the small scale roll-up test, and the full scale Michigan Mattress Test. The first of these methods gave the foam a Flame Spread Index of 10 and 3, in two separate tests run on different sets of testing apparatus. In the small scale roll-up test the sample self-extinguished in 125 seconds, and the amount of unburned foam and char was 95.8% by weight. In the full scale Michigan Mattress test the specimen self-extinguished in 125 seconds, and the amount of unburned foam and char was 96.9% by weight.

EXAMPLES 25–28

| Example | 25 | 26 | 27 | 28 |
|---|---|---|---|---|
| E-9151 | 100.0 | 100.0 | 100.0 | 100.0 |
| TDI 80/20 | 76.8 | 76.8 | 76.8 | 76.8 |
| 1100-220 | 70.0 | 70.0 | 70.0 | 70.0 |
| TM-101 | 125.0 | 125.0 | 125.0 | 125.0 |
| CYMEL® 303 | — | 10.0 | — | — |
| Hydrated alumina | 350.0 | 350.0 | 350.0 | 350.0 |
| Methylene chloride | 3.0 | 3.0 | 3.0 | 3.0 |
| Water | 2.8 | 2.8 | 2.8 | 2.8 |
| DEOA | 2.5 | 2.5 | 2.5 | 2.5 |
| N1AX® A-1 | 0.5 | 0.5 | 0.5 | 0.5 |
| TD-33 | 0.5 | 0.5 | 0.5 | 0.5 |
| CNF 664 | 0.6 | 0.6 | 1.8 | 2.4 |
| L-5307 | 0.75 | 0.75 | 0.75 | 0.75 |
| Index | 115 | 115 | 115 | 115 |
| Density, pcf | 6.4 | 6.1 | 7.0 | 6.9 |

Specimens from Examples 25, 26 and 28 were tested for Flame Spread Index by the method of ASTM E162-78. The values were 5 for Example 25; 25, 4 and 10 (run on three separate sets of apparatus) for Example 26; and 12 and 24 (run on two separate sets of apparatus) for Example 28. Specimens from Examples 26 and 28 were subjected to both the small scale roll-up test and the full scale Michigan Mattress Test, with the results summarized in Table III.

TABLE III

| | Example 26 | Example 28 |
|---|---|---|
| Small scale: | | |
| Time to self-extinguish, sec. | 140 | 115 |
| Weight % unburned foam and char | 94.5 | 96.3 |
| Full scale: | | |
| Time to self-extinguish, sec. | 180 | 110 |
| Weight % unburned foam and char | 97.9 | 99.0 |

EXAMPLES 29–31

| Example | 29 | 30 | 31 |
|---|---|---|---|
| E-9151 | 100.0 | 100.0 | 100.0 |
| TDI 80/20 | 76.8 | 76.8 | 54.3 |
| 1100-220 | 70.0 | 70.0 | 35.0 |
| TM-101 | 125.0 | 125.0 | 105.0 |
| FR 300 BA | 20.0 | 20.0 | 20.0 |
| CYMEL® 303 | — | 10.0 | 10.0 |
| Hydrated alumina | 330.0 | 330.0 | 230.0 |
| Methylene chloride | 3.0 | 3.0 | 3.0 |
| Water | 2.8 | 2.8 | 2.0 |
| DEOA | 2.5 | 2.5 | 2.5 |

-continued

| Example | 29 | 30 | 31 |
|---|---|---|---|
| N1AX® A-1 | 0.63 | 0.63 | — |
| TD-33 | 0.63 | 0.63 | — |
| CNF 664 | 2.0 | 2.0 | 1.6 |
| L-5307 | 0.75 | 0.75 | 0.75 |
| Index | 115 | 115 | 118 |
| Density, pcf | 6.2 | 6.3 | 6.4 |

Specimens from these examples were tested by the method of ASTM E162-78 and by the full scale Michigan Mattress Test. The results are summarized in Table IV.

TABLE IV

| | Example 29 | Example 30 | Example 31 |
|---|---|---|---|
| Flame Spread Index, ASTM E 162-78 | 5, 25 | 10, 5, 8 | 26, 8 |
| Michigan Mattress Test: | | | |
| Time to self extinguish, sec. | 140 | 155 | 150 |
| Weight % unburned foam and char | 97.9 | 97.9 | 96.9 |

EXAMPLE 32

An even more severe test is the Michigan Mattress Test run on a mattress that is covered. For purposes of comparison foam mattresses from Examples 26, 29, and 30 were covered with a Staph Chek 20 mattress cover, and the full-scale test was repeated. This cover is a vinyl coated nylon material containing a biocide, and is representative of waterproof mattress covers used in hospitals and other institutions. The results are summarized in Table V, which also includes results from the uncovered tests.

TABLE V

| | Foam of Example 26 | | Foam of Example 29 | | Foam of Example 30 | |
|---|---|---|---|---|---|---|
| | Uncovered | Covered | Uncovered | Covered | Uncovered | Covered |
| Time to self-extinguish, sec. | 180 | 435 | 140 | 450 | 155 | 450 |
| Weight % of unburned foam and char | 97.9 | 88.7 | 97.9 | 85.1 | 97.9 | 91.0 |

What is claimed is:

1. In the process for the manufacture of a flexible, resilient, flame retardant and intumescent polyurethane foam from a reaction mixture consisting essentially of at least one polyether polyol, at least one organic polyisocyanate, at least one flame retardant, at least one blowing agent, at least one surfactant, and at least one catalyst, the improvement wherein the amount of said flame retardant is from about 30 to about 160 phr, and said reaction mixture also contains from about 200 to about 400 phr of hydrated alumina uniformly dispersed in from about 10 to about 100 phr of a low-viscosity, linear, polyester diol.

2. The process of claim 1 wherein the reaction mixture also contains at least one char former selected from the group consisting of low molecular weight aldehydes, aldehyde generators, partially or completely etherified urea/formaldehyde condensates, melamine, and melamine derivatives having the formula

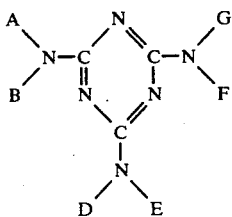

wherein A, B, D, E, F, and G are selected from the group consisting of hydrogen, methylol, and ROCH$_2$— in which R is an alkyl radical containing from 1 to 4 carbon atoms, and wherein at least one of A,B,D,E,F and G is methylol or RCOH$_2$—.

3. The process of claim 1 wherein said hydrated alumina and said flame retardant, and said low-viscosity linear polyester diol are first blended into a uniform dispersion before being mixed with the other components of said reaction mixture.

4. The process of claim 3 wherein said uniform dispersion also comprises at least one char former as set forth in claim 2.

5. The process of claim 3 wherein said uniform dispersion also comprises a low-boiling, fugitive, halogenated hydrocarbon.

6. The process of claim 1 wherein said polyether polyol comprises a dispersion of a polyhydrazodicarbonamide in a polyol prepared by the reaction of alkylene oxides and a polyhydric initiator.

7. The process of claim 1 wherein at least one polyether polyol is a polyether polyol that has been modified with acrylonitrile and/or styrene.

8. The process of claim 1 wherein said organic polyisocyanate is a mixture of 2,4-tolylene diisocyanate and 2,6 tolylene in a ratio of 80/20.

9. The process of claim 1 wherein said flame retardant comprises tris(1,3-dichloropropyl)phosphate.

10. The process of claim 1 wherein said flame retardant comprises tris(2-chloroethyl)phosphate.

11. The process of claim 1 wherein said flame retardant comprises tetrakis(2-chloroethyl)ethylene diphosphate.

12. The process of claim 1 wherein said flame retardant comprises tetrakis(2-chloroethyl)ethylene diphosphate and decabromodiphenyl oxide.

13. The process of claim 1 wherein the amount of said flame retard- and is from about 50 to about 145 parts by weight per 100 parts by weight of said polyether polyol.

14. The process of claim 1 wherein the amount of said low-viscosity linear polyester diol is from about 35 to about 80 parts by weight per 100 parts by weight of said polyether polyol.

15. The process of claim 1 wherein the amount of hydrated alumina is from about 230 to about 350 parts by weight per 100 parts by weight of said polyether polyol.

16. The process of claim 2 wherein the amount of said char former is from about 5 to about 30 parts by weight per 100 parts by weight of said polyether polyol.

17. The process of claim 16 wherein the amount of said char former is from about 10 to about 25 parts by weight per 100 parts by weight of said polyether polyol.

18. The process of claim 2 wherein said char former comprises hexa (methoxymethyl)melamine.

19. The process of claim 2 wherein said aldehyde generator is hexamethylenetetramine.

20. The process of claim 5 wherein the amount of said halogenated hydrocarbon is from about 2 to about 20 parts by weight per 100 parts by weight of said polyether polyol.

21. The process of claim 5 wherein said halogenated hydrocarbon is methylene chloride.

22. The process of claim 5 wherein said halogenated hydrocarbon is trichloromonofluoromethane.

23. The product of the process of claim 1.
24. The product of the process of claim 2.
25. The product of the process of claim 3.
26. The product of the process of claim 4.
27. The product of the process of claim 5.
28. The product of the process of claim 6.
29. The product of the process of claim 7.
30. The product of the process of claim 13.
31. The product of the process of claim 14.
32. The product of the process of claim 17.
33. The product of the process of claim 18.
34. The product of the process of claim 19.
35. The product of the process of claim 20.

36. The process of claim 3 wherein the amount of low-viscosity, linear polyester diol is from about 35 phr to about 100 phr.

* * * * *